United States Patent
Matsuda et al.

(10) Patent No.: US 9,893,577 B2
(45) Date of Patent: Feb. 13, 2018

(54) MOTOR INCLUDING PERMANENT MAGNET ROTOR WITH FLUX BARRIER

(71) Applicant: Nidec Corporation, Kyoto (JP)

(72) Inventors: Ryosuke Matsuda, Kyoto (JP); Shinichi Noda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 408 days.

(21) Appl. No.: 14/692,875

(22) Filed: Apr. 22, 2015

(65) Prior Publication Data

US 2015/0372578 A1   Dec. 24, 2015

(30) Foreign Application Priority Data

Jun. 20, 2014   (JP) .................................. 2014-127645

(51) Int. Cl.
*H02K 1/27*   (2006.01)
*H02K 21/12*   (2006.01)

(52) U.S. Cl.
CPC ......... *H02K 1/276* (2013.01); *H02K 2213/03* (2013.01)

(58) Field of Classification Search
CPC ...... H02K 1/276; H02K 1/272; H02K 1/2706; H02K 1/27; H02K 1/2766; H02K 2213/03; H02K 2201/03; H02K 21/12; H02K 21/14; H02K 21/16
USPC ............ 310/156.07, 156.53, 156.56, 156.57, 310/261.1
See application file for complete search history.

(56) References Cited

U.S. PATENT DOCUMENTS

| | | | |
|---|---|---|---|
| 8,344,570 B2 | 1/2013 | Kawamura et al. | |
| 2004/0145263 A1* | 7/2004 | Kojima | H02K 1/276 310/156.53 |
| 2006/0022541 A1* | 2/2006 | Ong | H02K 7/003 310/156.53 |
| 2011/0050022 A1* | 3/2011 | Li | H02K 1/276 310/156.46 |
| 2012/0104892 A1* | 5/2012 | Kamei | H02K 1/276 310/156.53 |
| 2012/0187877 A1* | 7/2012 | Yamagiwa | H02K 1/276 318/400.02 |

FOREIGN PATENT DOCUMENTS

| | | |
|---|---|---|
| JP | 2000-092763 A | 3/2000 |
| JP | 3776171 B2 | 5/2006 |
| JP | 2007-014199 A | 1/2007 |

(Continued)

*Primary Examiner* — Michael Andrews
(74) *Attorney, Agent, or Firm* — Keating & Bennett, LLP

(57) ABSTRACT

A rotating portion of a motor includes magnets and a rotor core that holds the magnets in holding holes. Each of the magnets includes a first magnet element and two second magnet elements. The two second magnet elements are located on opposite circumferential sides of the first magnet element, and a coercivity of the two second magnet elements is smaller than the first magnet element. The rotor core includes a flux barrier including a void located on a radially inner side of the first magnet elements. A width of the magnets in a direction perpendicular or substantially perpendicular to a radial direction passing through a center of the corresponding first magnet element is larger than a width in the same direction of the corresponding flux barrier within a plane perpendicular or substantially perpendicular to the center axis.

9 Claims, 4 Drawing Sheets

(56) References Cited

FOREIGN PATENT DOCUMENTS

| | | | |
|---|---|---|---|
| JP | 2010-045919 | A | 2/2010 |
| JP | 4736472 | B2 | 7/2011 |
| JP | 2011-239609 | A | 11/2011 |
| JP | 4913241 | B2 | 4/2012 |
| JP | 5288724 | B2 | 9/2013 |
| JP | 5334295 | B2 | 11/2013 |
| JP | 5361261 | B2 | 12/2013 |

* cited by examiner

MOTOR INCLUDING PERMANENT MAGNET ROTOR WITH FLUX BARRIER

BACKGROUND OF THE INVENTION

1. Field of the Invention

The present invention relates to an electric motor.

2. Description of the Related Art

There is known a permanent magnet synchronous motor that enables variable speed operation over a wide range from low speed to high speed by reversibly changing an amount of magnetic flux of some of a plurality of permanent magnets (referred to as a "variable magnet motor" below). The variable magnet motor is configured by using two types or more of permanent magnets in, for example, an IPM (interior permanent magnet) type motor.

For example, in a permanent magnet motor 21 disclosed in Japanese Patent Laid-Open No. 2010-154676, one first permanent magnet 33 and two second permanent magnets 34 are housed in each permanent magnet housing hole 31a of a rotor 24 as shown in FIG. 2. The two second permanent magnets 34 are located on opposite circumferential sides of the first permanent magnet. The first permanent magnet 33 is a high-coercivity permanent magnet, and has a fixed amount of magnetic flux. The second permanent magnets 34 are low-coercivity permanent magnets, and have variable amounts of magnetic flux.

A rotor 1 disclosed in Japanese Patent Laid-Open No. 2010-4673 includes a rotor core 2, and permanent magnets 3 and 4. The permanent magnets 3 and 4 are arranged in the rotor core 2. The product of a coercivity and a thickness in a magnetization direction of the permanent magnet 3 is smaller than that of the permanent magnet 4. A pair of permanent magnets 4 are located on opposite circumferential sides of each permanent magnet 3. A pair of magnetic barriers (flux barriers) are arranged between the pair of permanent magnets 4 and an outer circumferential surface of the rotor core 2, respectively. No magnetic barrier is arranged between the permanent magnet 3 and the outer circumferential surface of the rotor core 2.

Generally, a flux barrier is arranged around a permanent magnet in a rotor core of the IPM type motor. This is to increase an amount of magnetic flux contributing to torque by causing magnetic flux to easily flow between a stationary portion and a rotating portion. As a result, torque and efficiency in the motor can be improved.

Although the flux barrier is also provided in the rotor 1 disclosed in Japanese Patent Laid-Open No. 2010-4673, the flux barrier is provided for the purpose of efficiently changing an amount of magnetic flux of the permanent magnet 3. However, when the flux barriers are arranged between the permanent magnets 4 with a large amount of magnetic flux and the outer circumference of the rotor 1, the efficiency of the motor is decreased.

SUMMARY OF THE INVENTION

A motor according to a preferred embodiment of the present invention includes a rotating portion configured to rotate about a center axis; a stationary portion that is positioned around the rotating portion; and a bearing mechanism that rotatably supports the rotating portion. The rotating portion includes a plurality of magnets that are disposed in a circumferential direction, and a rotor core that includes a plurality of holding holes extending in an axial direction and holds the plurality of magnets in the plurality of holding holes, respectively. Each of the plurality of magnets includes a first magnet element and two second magnet elements. The first magnet element has a circumferentially extensive plate-shaped configuration. The two second magnet elements are located on opposite circumferential sides of the first magnet element, and a coercivity of the two second magnet elements is smaller than a coercivity of the first magnet element. The rotor core includes a flux barrier including a void located on a radially inner side of each of the first magnet elements and that is sandwiched between a wall surface on the radially inner side and a wall surface on a radially outer side. A width of each of the magnets including the first magnet elements in a direction perpendicular or substantially perpendicular to a radial direction passing through a center of the corresponding first magnet element is larger than a width in the same direction of the corresponding flux barrier within a plane perpendicular or substantially perpendicular to the center axis.

In accordance with various preferred embodiments of the present invention, it is possible to efficiently change an amount of magnetic flux of the second magnet element while preventing a decrease in the efficiency of the motor caused by the flux barrier.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
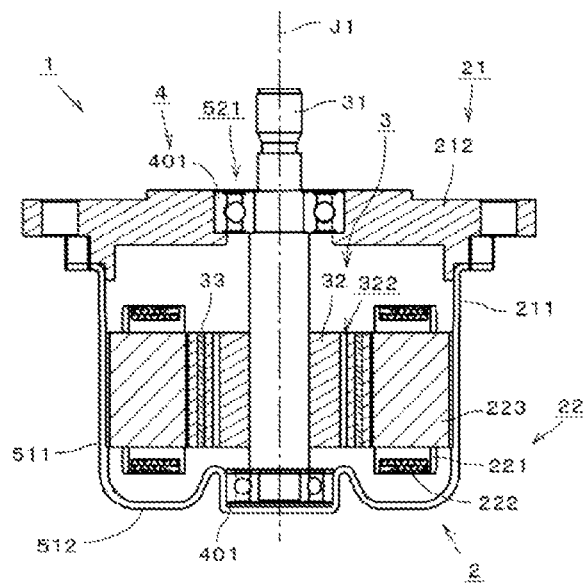
FIG. 1 is a vertical sectional view illustrating a motor according to a preferred embodiment of the present invention.

It is assumed herein that a top-bottom direction in FIG. 1 that is a direction parallel or substantially parallel to a center axis of a motor is defined as a top-bottom direction of the motor for convenience of description. The top-bottom direction does not need to match a gravity direction. It is also assumed herein that the direction parallel or substantially parallel to the center axis is referred to as an "axial direction", and a radial direction and a circumferential direction centering on the center axis are referred to simply as a "radial direction" and a "circumferential direction", respectively.

FIG. 1 is a vertical sectional view illustrating a motor 1 according to one preferable preferred embodiment of the present invention. Oblique parallel lines in details of a section are omitted. The motor 1 is a rotating electrical machine. The motor 1 is preferably an inner rotor type, and is an IPM (interior permanent magnet) type motor. The motor 1 includes a stationary portion 2, a rotating portion 3, and a bearing mechanism 4. The bearing mechanism 4 supports the rotating portion 3 so as to be rotatable about a center axis J1 of the motor 1 with respect to the stationary portion 2.

The stationary portion 2 is positioned around the rotating portion 3. The stationary portion 2 includes a housing 21 and a stator 22. The housing 21 preferably includes a bottomed cylindrical or substantially-cylindrical housing member 211 and a lid member 212. The housing member 211 includes a cylindrical portion 511 and a bottom portion 512. The lid member 212 preferably has a rectangular or substantially rectangular shape, and is attached to an upper portion of the cylindrical portion 511. An opening 521 is provided in the center of the lid member 212. The stator 22 includes a stator core 223, a plurality of insulators 221, and a plurality of coils 222. Each tooth of the stator core 223 is covered with one insulator 221. For example, the insulators 221 are preferably made of an insulating resin material. One coil 222 is provided on each of the insulators 221. More specifically, a conductive wire is preferably wound around the tooth via the insulator 221 to define the coil 222. Electric power is supplied to the stationary portion 2 from an external power source or the like, so that the rotating portion 3 rotates about the center axis J1. Note that insulating paper or the like may alternatively be provided between the coils 222 and the stator core 223 instead of the insulators 221.

The bearing mechanism 4 is preferably defined by a plurality of bearings 401. In the present preferred embodiment, the number of the bearings 401 preferably is two, and the bearings 401 preferably are ball bearings, for example. The bearings 401 may alternatively be bearings having other structures than ball bearings. One of the bearings 401 is fixed to the lid member 212 in the opening 521. The other of the bearings 401 is fixed to the bottom portion 512.

The rotating portion 3 preferably includes a shaft 31, a rotor core 32, and a plurality of magnets 33. The shaft 31 is a member that extends in the axial direction, and is provided along the center axis J1. In the present preferred embodiment, the shaft 31 preferably has a columnar or substantially columnar shape. Note that the shaft 31 may be either a completely solid member or a hollow member. The shaft 31 is supported rotatably about the center axis J1 by the bearing mechanism 4. The rotor core 32 preferably has a cylindrical or substantially cylindrical shape. The shaft 31 is passed through a through hole of the rotor core 32. The shaft 31 is fixed to the inside of the through hole of the rotor core 32 by press-fitting, bonding, or the like, for example. In the radial direction, the rotor core 32 is arranged on an inner side of the stator 22. An outer circumferential surface of the rotor core 32 is located close to an inner circumferential surface of the stator 22.

Figure 2:
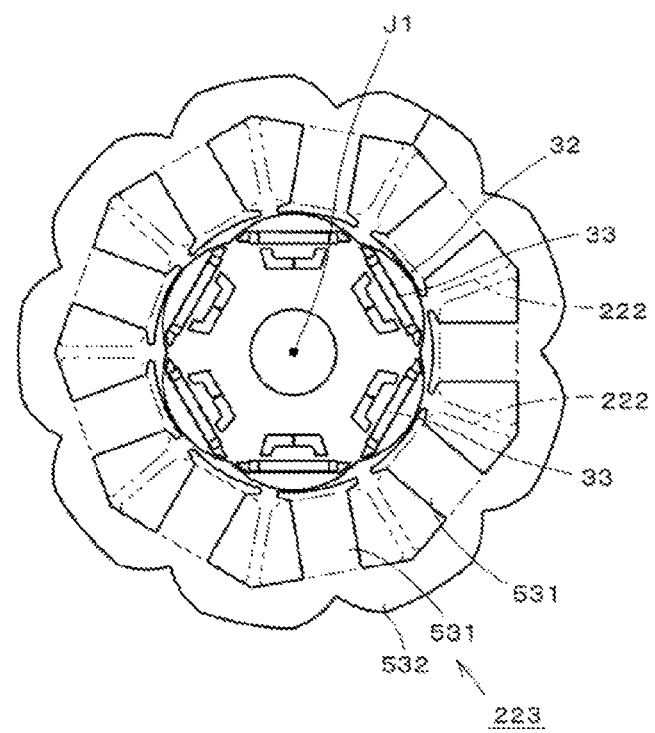
FIG. 2 is a plan view illustrating a stator core, a rotor core, and a plurality of magnets according to a preferred embodiment of the present invention.

FIG. 2 is a plan view illustrating the stator core 223, the rotor core 32, and the plurality of magnets 33. In FIG. 2, schematic shapes of the plurality of coils 222 are indicated by an alternating long and two short dashes line. The stator core 223 preferably includes a plurality of teeth 531 and a core back 532. The core back 532 has an annular or substantially annular shape centering on the center axis J1. In the present preferred embodiment, the number of the teeth 531 preferably is nine, and the number of slots preferably is nine, for example. Each of the teeth 531 extends radially inward toward the rotor core 32 from the core back 532. The stator core 223 is stacked steel plates preferably defined by axially stacking a plurality of electromagnetic steel plates.

Figure 3:
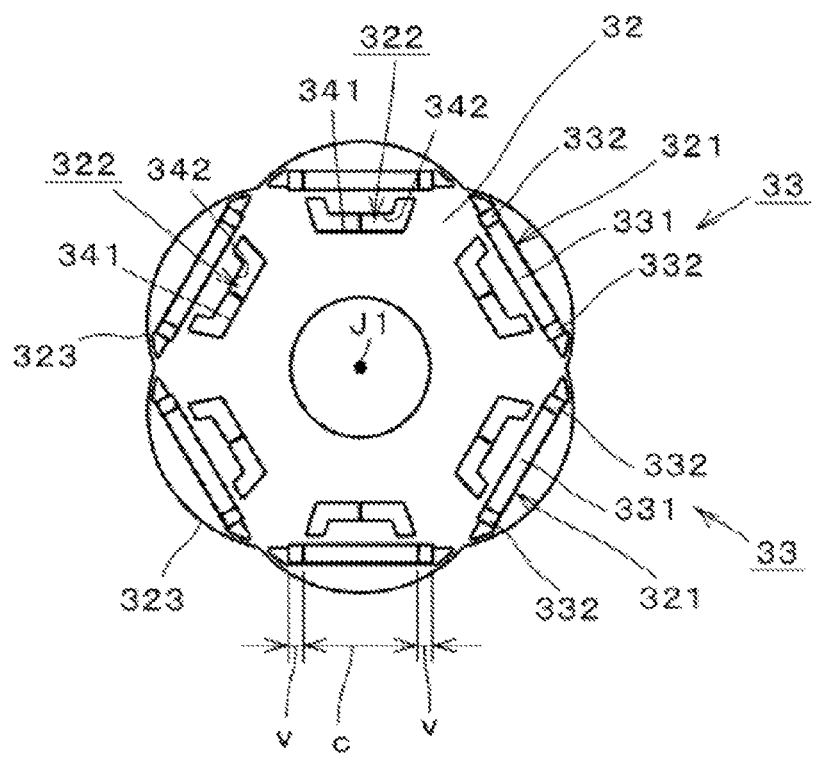
FIG. 3 is a plan view illustrating the rotor core and the plurality of magnets according to a preferred embodiment of the present invention.

FIG. 3 is a plan view illustrating the rotor core 32 and the plurality of magnets 33. The rotor core 32 is preferably defined by axially stacking a plurality of, for example, electromagnetic steel plates. The plurality of magnets 33 are disposed in the circumferential direction. In the present preferred embodiment, the number of the magnets preferably is six, for example, but any other desirable number could be used. In other words, the number of poles of the motor 1 preferably is six in the present preferred embodiment, for example. The number of poles of the rotating portion 3 and the stationary portion 2 may be variously changed. Each of the magnets 33 preferably includes one first magnet element 331 and two second magnet elements 332. Of course, each of the magnets 33 may include other auxiliary magnets, e.g., one or more third magnet elements. The first magnet element 331 and the second magnet elements 332 are permanent magnets, respectively. The rotor core 32 preferably includes a plurality of holding holes 321 that extend in the axial direction. The plurality of holding holes 321 are disposed in the circumferential direction. Each of the holding holes 321 extends in a direction perpendicular or substantially perpendicular to the radial direction as viewed from the axial direction. The plurality of magnets 33 are held in the plurality of holding holes 321, respectively. Each of the holding holes 321 axially penetrates the rotor core 32. Although not shown in the drawings, a fall-preventing member for the magnets 33, such as, for example, a notch, ledge, or narrowed portion, is preferably attached to upper and lower ends of each of the holding holes 321 to prevent the magnets 33 from falling out of the rotor core 32. Each of the magnets 33 extends in the axial direction, and exists over an entire or substantially an entire axial length within the holding hole 321. The number of the first magnet elements 331 constituting each of the magnets 33 may be two or more, and the number of the second magnet elements 332 constituting each of the magnets 33 may be three or more, for example.

The first magnet element 331 of each of the magnets 33 preferably has a circumferentially extensive plate-shaped or flat shape. In an example in FIG. 3, the first magnet element 331 has a flat plate-shaped configuration perpendicular or substantially perpendicular to the radial direction passing through the center. The two second magnet elements 332 are located at opposite circumferential end portions of the first magnet element 331, respectively. A circumferential width of each of the second magnet elements 332 is smaller than a circumferential width of the first magnet element 331. The circumferential width described here indicates an angular range in the circumferential direction as viewed from the center axis J1. The shapes of the first magnet element 331 and the second magnet elements 332 are not limited to those shown in FIG. 3. A thickness of the first magnet element 331 may not be constant. For example, the first magnet element 331 may have a plate-shaped configuration that is at least partially curved.

In the example in FIG. 3, the first magnet element 331 and the two second magnet elements 332 are preferably aligned on a straight or substantially straight line. As long as the two second magnet elements 332 are respectively located on opposite circumferential sides of the first magnet element 331, the two second magnet elements 332 may not be in contact with the first magnet element 331. Also, the two second magnet elements 332 only need to be respectively located approximately on the opposite circumferential sides of the first magnet element 331, and do not need to be located on the opposite circumferential sides in a strict sense. A coercivity of the two second magnet elements 332 is smaller than a coercivity of the first magnet element 331. Preferably, the first magnet element 331 is an Nd—Fe—B magnet, and the second magnet elements 332 are 2-17-type Sm—Co magnets, for example. Note that the magnet materials used for the first magnet element 331 and the second magnet elements 332 are not limited to those described above, and may be changed as appropriate. When the motor 1 is stationary or rotating, an amount of magnetic flux of each of the second magnet elements 332 can be changed by a magnetic field from the stator 22 by a d-axis current.

Here, it is assumed that a length of the first magnet element 331 in a longitudinal direction of the magnet 33 is c, and a length in the same direction of each of the second magnet elements 332 is v. When v is too small relative to c, a variable width of the amount of magnetic flux of the second magnet element 332 becomes small. Thus, a variation amount of a total flux linkage of the entire magnet 33 is small, and it becomes difficult to improve efficiency at the time of high-speed rotation. When v is too large relative to c, magnetic loading is decreased. As a result, a copper loss of the motor 1 is increased, so that efficiency particularly at the time of low-speed/medium-speed rotation is reduced. In consideration of the above points, a ratio v/c is preferably about 0.2 or more to about 0.3 or less, for example.

The rotor core 32 includes a plurality of flux barriers 322. Each of the flux barriers 322 is provided on a radially inner side of each of the first magnet elements 331. Each of the flux barriers 322 preferably includes a void, which axially penetrates through the rotor core 32. In the present preferred embodiment, air is present in each of the flux barriers 322. Note that resin or the like may alternatively be provided in each of the flux barriers 322 instead of air. Each of the flux barriers 322 only needs to be a region with larger magnetic resistance than another portion in the rotor core 32. The same applies to other flux barriers described later. Each of the flux barriers 322 extends approximately in the circumferential direction. In other words, each of the flux barriers 322 includes a void sandwiched between a wall surface 341 on the radially inner side and a wall surface 342 on a radially outer side as viewed from the axial direction. As shown in FIG. 1, each of the flux barriers 322 penetrates through the rotor core 32.

The outer circumferential surface of the rotor core 32 includes a plurality of convex portions 323. Each of the convex portions 323 projects radially outward on the radially outer side of each of the first magnet elements 331. Each of the convex portions 323 exists along the center axis J1 and each of the first magnet elements 331 throughout the axial direction. That is, the rotor core 32 preferably has the same sectional shape perpendicular or substantially perpendicular to the center axis J1 at any position in the axial direction. A circumferential center position of each of the convex portions 323 corresponds to a circumferential center position of each of the first magnet elements 331 and a circumferential center position of each of the flux barriers 322. When the convex portions 323 are provided, a magnetic flux density distribution between the stationary portion 2 and the rotating portion 3 can be made closer to a sine wave, and a torque ripple produced in the rotation of the motor 1 is thus significantly reduced. If a curvature radius of the convex portions 323 is too small, an air gap becomes larger, leakage flux between the teeth 531 and the magnets 33 is increased, and a torque characteristic is deteriorated. Thus, the curvature radius of the convex portions 323 is preferably about 0.3 times or more to about 0.4 times or less of a diameter of the rotor core 32 within a plane perpendicular or substantially perpendicular to the center axis J1, for example. The diameter of the rotor core 32 corresponds to a diameter of a circle circumscribed with a section of the rotor core 32.

Figure 4:
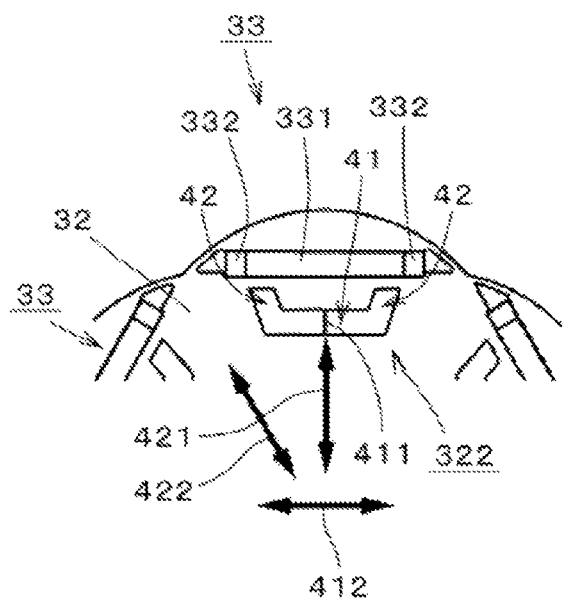
FIG. 4 is a plan view illustrating the rotor core and the plurality of magnets according to a preferred embodiment of the present invention in an enlarged scale.

FIG. 4 is a view illustrating one magnet 33 and its vicinity in an enlarged scale. Each of the flux barriers 322 preferably includes a center portion 41 and two extension portions 42. Within the plane perpendicular or substantially perpendicular to the center axis J1, the center portion 41 extends in a direction perpendicular or substantially perpendicular to the radial direction passing through the center of the first magnet element 331. A circumferential position of the center of the first magnet element 331 corresponds or substantially corresponds to a circumferential position of the center of the flux barrier 322 and the center portion 41. The two extension portions 42 extend toward an outer circumferential side of the rotor core 32 from both ends of the center portion 41, respectively. The two extension portions 42 gradually separate from each other as extending toward the outer circumferential side of the rotor core 32. In other words, a circumferential distance between the extension portion 42 and the extension portion 42 adjacent to each other is gradually increased with distance from the center axis J1 toward the outer circumferential side of the rotor core 32 in plan view. To ensure a strength of the rotor core 32, the center portion 41 is preferably provided with a reinforcement portion 411. The reinforcement portion 411 extends in the radial direction in plan view, to connect portions of the rotor core 32 on the radially inner side and the radially outer side of the center portion 41.

Within the plane perpendicular or substantially perpendicular to the center axis J1, the two extension portions 42 extend toward two boundaries between the first magnet element 331 and the two second magnet elements 332, respectively. Moreover, a width of the magnet 33 including the first magnet element 331 in a direction 412 perpendicular or substantially perpendicular to the radial direction passing through the center of the first magnet element 331, i.e., a length in the longitudinal direction of the magnet 33 is larger than a width in the same direction of the corresponding flux barrier 322 within the plane perpendicular or substantially perpendicular to the center axis J1. More preferably, a circumferential width of each of the magnets 33 is larger than a circumferential width of each of the flux barriers 322. That is, when it is assumed that each of the flux barriers 322 is viewed from the center axis J1, at least portions of the two second magnet elements 332 appear protruding from both sides of the flux barrier.

Within the plane perpendicular or substantially perpendicular to the center axis J1, the width in the longitudinal direction of each of the flux barriers 322 is preferably smaller than the width in the longitudinal direction of each of the magnets 33, and each of the flux barriers 322 exists on the radially inner side of each of the magnets 33. When the amounts of magnetic flux, i.e., amounts of magnetization of the two second magnet elements 332 are changed by using magnetic flux by a d-axis current from the stationary portion 2, magnetic flux from the stator 22 is prevented from flowing through the first magnet element 331 due to the large magnetic resistance in each of the flux barriers 322. Accordingly, much magnetic flux is guided to the second magnet elements 332, and the amounts of magnetic flux of the second magnet elements 332 can be efficiently changed. As a result, the rotation from low-speed to high-speed can be efficiently performed. Flux-weakening control may be performed after reducing (including demagnetization) the amounts of magnetic flux of the second magnet elements 332.

Each of the flux barriers 322 preferably has a convex shape toward the radially inner side within the plane perpendicular to the center axis J1. Accordingly, magnetic flux toward the first magnet element 331 is efficiently reduced, and the magnetic flux is concentrated in the second magnet elements 332 at the time of changing the amounts of magnetic flux of the plurality of second magnet elements 332. As a result, magnetization and demagnetization of the second magnet elements 332 are easily performed, and a current necessary to change the amount of magnetic flux is significantly reduced. In plan view, the shape of each of the flux barriers 322 is not limited to that shown in FIG. 4, and may alternatively be, for example, an arc shape, an oval shape, a U shape, or the like. Preferably, in plan view, the shape of each of the flux barriers 322 is symmetric with respect to an axis of symmetry aligned with the radial direction. The shape of the flux barrier 322 corresponds to an outer shape of the flux barrier 322, and more precisely, corresponds to a shape of an outline of an internal surface defining a through hole that is the flux barrier 322.

In the flux barriers 322 having any shape, both end portions of each of the flux barriers 322 preferably extend toward the two boundaries between the first magnet element 331 and the two second magnet elements 332, respectively. In an example in FIG. 4, the both end portions of each of the flux barriers 322 are included in the two extension portions 42. In the present preferred embodiment, two directions from the ends of the center portion 41 toward the two boundaries between the first magnet element 331 and the two second magnet elements 332 cross the two second magnet elements 332, respectively. Therefore, practically, it can be considered that the two second magnet elements 332 are located on extension lines of the both end portions of the flux barrier 322, respectively.

Since each of the flux barriers 322 is preferably provided on the radially inner side of each of the magnets 33, it is possible to cause the magnetic flux to easily flow to the second magnet elements while maintaining rigidity of the rotor core as compared to a case in which the flux barrier is arranged on the radially outer side of the magnet. As a result, a decrease in efficiency of the motor is significantly reduced as compared to the case in which the flux barrier is arranged on the radially outer side of the magnet.

In the example in FIG. 4, since each of the flux barriers 322 includes the center portion 41 and the two extension portions 42, a radial width of each of the flux barriers 322 is kept small as compared to a case in which a V-shaped flux barrier is provided. Thus, each of the flux barriers 322 is easily designed to be positioned on the radially inner side of each of the magnets 33.

Here, it is assumed that a direction parallel or substantially parallel to the radial direction passing through the center of the first magnet element 331 is referred to as a first direction 421, and a direction parallel or substantially parallel to the radial direction passing through the center between the magnet 33 including the first magnet element 331 and the adjacent magnet 33 is referred to as a second direction 422. Directions in which the both end portions of the flux barrier 322 extend are preferably aligned with the first direction 421, the second direction 422, or a direction between the first direction 421 and the second direction 422. Accordingly, when the amount of magnetic flux of each of the second magnet elements 332 is changed, the magnetic flux from the stator 22 is smoothly guided to the second magnet elements 332 along the flux barrier 322, and is concentrated in the second magnet elements 332. As a result, the magnetization and the demagnetization of the second magnet elements 332 are more easily performed.

On the other hand, the center portion 41 of each of the flux barriers 322 prevents magnetic flux from the first magnet element 331 from flowing to the radially inner side of the rotor core 32. Accordingly, the magnetic flux is largely guided out of the rotor core 32, and torque and efficiency of the motor 1 are improved. Because of the flux barrier 322, it is possible to efficiently change the amounts of magnetic flux of the second magnet elements 332 while also significantly reducing or preventing a decrease in the efficiency of the motor 1.

Figure 5:
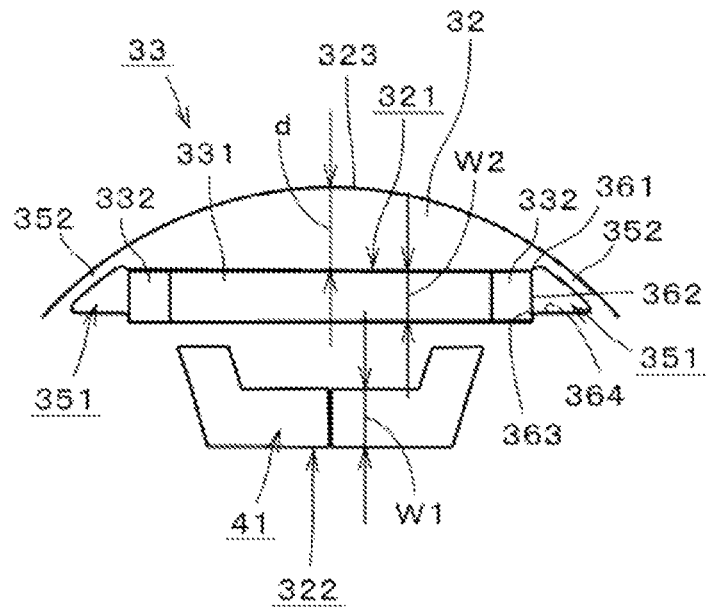
FIG. 5 is a plan view illustrating the rotor core and the magnet according to a preferred embodiment of the present invention in a further enlarged scale.

In the present preferred embodiment, the flux barrier 322 preferably includes air therein, and magnetic permeability thereof is equal or substantially equal to that of the magnet 33. If the magnetic resistance of the flux barrier 322 is relatively smaller than the magnetic resistance of the permanent magnet, the magnetic flux leaks into the flux barrier 322, and the torque characteristic is deteriorated. Thus, a radial width W1 of the center portion 41 of each of the flux barriers 322 is preferably larger than a width W2 in the same direction of the center of each of the first magnet elements 331 within the plane perpendicular or substantially perpendicular to the center axis J1 as shown in FIG. 5. On the other hand, if the width W1 of each of the flux barriers 322 is too large, it becomes difficult to ensure a mechanical strength of the rotor core 32. Accordingly, the radial width W1 of the center portion 41 of each of the flux barriers 322 is preferably about 1.1 times or more to about 1.5 times or less of the width W2 in the same direction of the center of each of the first magnet elements 331, for example.

Also, it is assumed that a distance between the outer circumferential surface of the rotor core 32 and each of the first magnet elements 331 in the radial direction passing through the center of the first magnet element 331 is d. The distance d is a so-called embedded depth of the magnet 33. When the distance d is made small by decreasing the embedded depth, leakage flux from the rotor core 32, i.e., short-circuit flux is decreased, and the magnetic flux contributing to the occurrence of torque is increased. Accordingly, the torque is improved, and the efficiency in low-speed and medium-speed regions is improved.

On the other hand, if the distance d is made too small, q-axis inductance is reduced, and a saliency ratio at the rotating portion 3 becomes smaller. As a result, there are disadvantages such as a decrease in reluctance torque and a decrease in flux weakening effect. In addition, if the distance d is made extremely small, a mechanical strength of a portion between the outer circumferential surface of the rotor core 32 and an outer edge of each of the holding holes 321 is lowered. Since the motor 1 is used in the rotation from low speed to high speed, the rotor core 32 is required to have a sufficient strength for the high-speed rotation. By not making the distance d too small, the saliency ratio is not decreased, and output power in a high-speed region is improved. According to the above conditions, the distance d is preferably about 1.5 times or more to about 2.0 times or less of the width W2 of the first magnet element 331, for example. Although the condition is not limited by the number of magnetic poles, the condition is particularly suitable for the case in which the number of magnetic poles is six as shown in FIG. 3.

The rotor core 32 is preferably provided with a plurality of lateral flux barriers 351. The lateral flux barriers 351 include voids respectively located on opposite circumferential sides of each of the magnets 33. Each of the lateral flux barriers 351 and the magnet 33 are in contact only at one of surfaces on the opposite circumferential sides of the magnet 33. In other words, each of the lateral flux barriers 351 is not in contact with the other of the surfaces of the magnet 33. Since the two lateral flux barriers 351 are in contact with only the both side surfaces of the magnet 33, the magnetic flux from the stator 22 is efficiently guided to the second magnet elements 332 at the time of changing the amounts of magnetic flux of the second magnet elements 332.

A portion between each of the lateral flux barriers 351 and the outer circumferential surface of the rotor core 32 is an elongated rib portion 352 that extends in the circumferential direction within the plane perpendicular or substantially perpendicular to the center axis J1. A width of the rib portion 352 is preferably constant or substantially constant in plan view. Accordingly, it is possible to reduce leakage flux of the magnet 33 and also maintain a strength of the portion between the lateral flux barrier 351 and the outer circumferential surface of the rotor core 32. It is also possible to efficiently guide the magnetic flux from the stator 22 to the second magnet elements 332 at the time of changing the amounts of magnetic flux of the second magnet elements 332.

As described above, the plurality of convex portions 323 are provided on the outer circumferential portion of the rotor core 32. An existence region of the rotor core 32 lateral to the magnet 33 is limited by each of the convex portions 323, so that the magnetic flux is efficiently guided to the second magnet elements 332. Particularly, by providing both the convex portion 323 and the lateral flux barriers 351, efficiency of changing the amounts of magnetic flux of the second magnet elements 332 is largely improved.

In an example shown in FIG. 5, an end point 361 on the radially outer side of a boundary between each of the lateral flux barriers 351 and each of the second magnet elements 332 corresponds to an end point of a side 362 of the second magnet element 332 in contact with the lateral flux barrier 351 within the plane perpendicular or substantially perpendicular to the center axis J1. An end point 363 on the radially inner side of the boundary between the lateral flux barrier 351 and the second magnet element 332 is located on the side 362. In other words, a portion of the rotor core 32 is provided as a projecting portion 364 that projects radially outward between the second magnet element 332 and the lateral flux barrier 351. Accordingly, a circumferential position of the magnet 33 is fixed.

Figure 6:
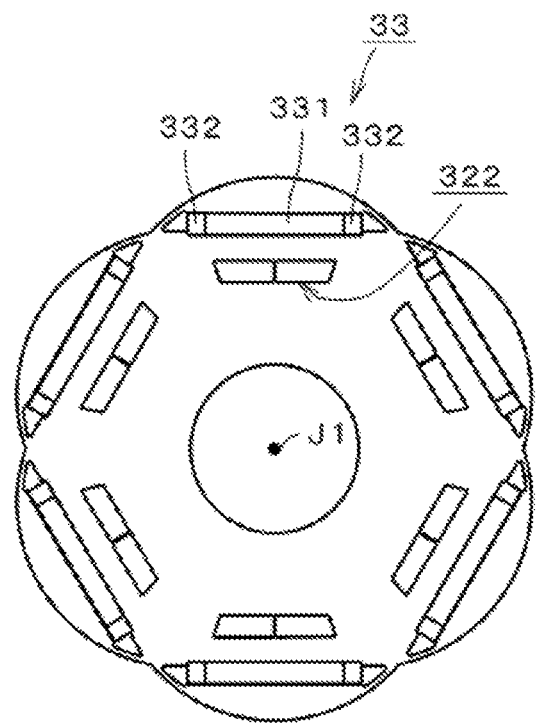
FIG. 6 is a plan view illustrating another example of flux barriers according to a preferred embodiment of the present invention.

FIG. 6 is a plan view illustrating another example of the flux barriers 322. As shown in FIG. 6, the plurality of flux barriers 322 are located on the radially inner side of the plurality of magnets 33, respectively. The plurality of flux barriers 322 have a straight or substantially straight shape extending in the direction perpendicular or substantially perpendicular to the radial direction passing through the center of the first magnet element 331 within the plane perpendicular or substantially perpendicular to the center axis J1. The other constituent elements of the rotating portion 3 are preferably the same as those of the configuration shown in FIG. 3, and a detailed description thereof is omitted. Each of the flux barriers 322 in FIG. 6 is also a void located on the radially inner side of each of the first magnet elements 331 similarly to the structure shown in FIG. 3. Each of the flux barriers 322 is sandwiched between the wall surface on the radially inner side and the wall surface on the radially outer side. In the present preferred embodiment, the radial width of the center portion of each of the flux barriers 322 preferably is about 1.1 times or more to about 1.5 times or less of the width in the same direction of each of the first magnet elements 331 within the plane perpendicular or substantially perpendicular to the center axis J1, for example.

The width of each of the magnets 33 in the direction perpendicular or substantially perpendicular to the radial direction passing through the center of each of the first magnet elements 331, i.e., the width in the longitudinal direction of each of the magnets 33 is larger than the width in the same direction of each of the flux barriers 322 within the plane perpendicular or substantially perpendicular to the center axis J1. More preferably, the circumferential width of each of the magnets 33 is larger than the circumferential width of each of the flux barriers 322. Accordingly, when the amounts of magnetic flux of the second magnet elements 332 are changed, the magnetic flux from the stator 22 is easily concentrated in the second magnet elements 332, and the amounts of magnetic flux of the second magnet elements 332 are efficiently changed.

Figure 7:
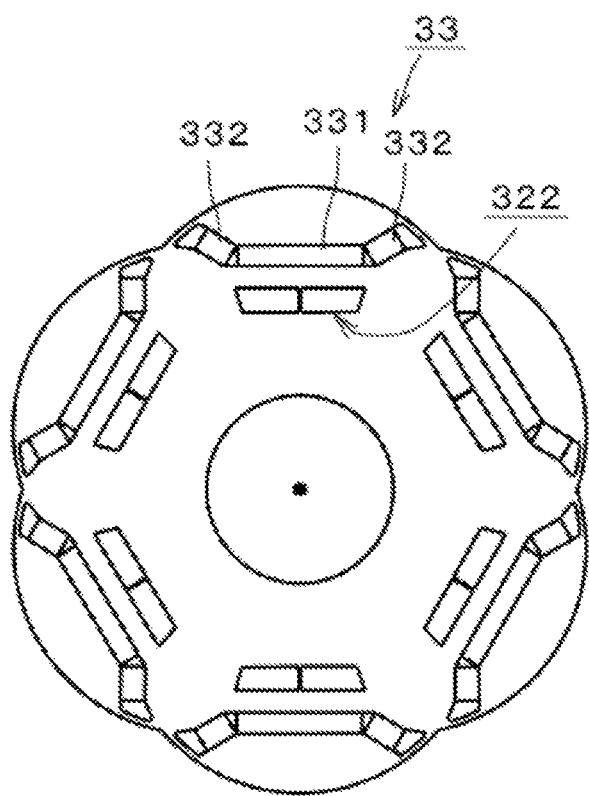
FIG. 7 is a plan view illustrating another example of the plurality of magnets according to a preferred embodiment of the present invention.

FIG. 7 is a plan view illustrating another example of the magnets 33.

In FIG. 7, although the two second magnet elements 332 are respectively located on the opposite circumferential sides of the first magnet element 331, positions of the two second magnet elements 332 are preferably different from those in FIG. 6. The other constituent elements are the same as those in FIG. 6, and a description thereof is omitted. In FIG. 7, the first magnet element 331 is arranged perpendicular or substantially perpendicular to the radial direction similarly to FIG. 6. The two second magnet elements 332 are directed circumferentially outward and radially outward of the first magnet element 331 from the both end portions of the first magnet element 331, respectively. A relationship between circumferential sizes of each of the magnets 33 and of each of the flux barriers 322 is the same as that of the configuration shown in FIG. 6, and the same effects are obtained.

The motor 1 is not limited to the preferred embodiments and the modifications described above, and may be variously changed.

Each of the first magnet elements 331 does not need to be precisely perpendicular or substantially perpendicular to the radial direction passing through the center. The shape and the arrangement of each of the first magnet element 331 and each of the two second magnet elements 332 may be variously changed within a range in which the effects by the flux barrier 322 are obtained. The magnet 33 may be a continuous magnet. That is, a portion of the continuous magnet may be the first magnet element 331 and other portions thereof may be the second magnet elements 332.

As long as there is a sufficient region on the radially inner side of the magnet 33 in plan view, the shape of the flux barrier 322 may be any desirable shape, such as, for example, a V shape as viewed from the axial direction, and is not particularly limited. The reinforcement portion 411 may not be provided in the flux barrier 322, or a plurality of reinforcement portions may be provided therein.

Although the lateral flux barrier 351 is preferably provided on the opposite circumferential sides of each of the magnets 33, the lateral flux barrier 351 may be provided on only one circumferential side of each of the magnets 33. The shape of the lateral flux barrier 351 may be variously changed. Another flux barrier may be further provided in the rotor core 32.

Various methods may be used as methods of fixing the plurality of magnets 33 to the rotor core 32. For example, the magnets 33 may be fixed to the rotor core 32 by an adhesive, for example. A portion of the rotor core 32 that is the stacked steel plates may fix the positions of the magnets 33.

The other structures such as the housing 21 and the stator 22 may be also variously changed. For example, the housing 21 may be obtained by combining a plurality of (for example, three or more) members if so desired.

The configurations in the above preferred embodiments and the respective modifications may be combined as appropriate unless they are incompatible with each other.

The motor according to various preferred embodiments of the present invention preferably may be used as a drive source for various applications. For example, the motor according to various preferred embodiments of the present invention preferably may be used for outdoor unit compressors of air conditioners, washing machines, EV (electric vehicle) driving motors, HEV (hybrid electric vehicle) driving motors, and electric power steering in which variable speed operation over a wide range is demanded.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
    a rotating portion that rotates about a center axis;
    a stationary portion positioned around the rotating portion; and
    a bearing mechanism that rotatably supports the rotating portion; wherein
    the rotating portion includes:
        a plurality of magnets that are disposed in a circumferential direction; and
        a rotor core that includes a plurality of holding holes extending in an axial direction and holds the plurality of magnets in the plurality of holding holes, respectively;
    each of the plurality of magnets includes a first magnet element and two second magnet elements;
    the first magnet element has a circumferentially extensive plate-shaped configuration;
    the two second magnet elements are located on opposite circumferential sides of the first magnet element, and a coercivity of the two second magnet elements is smaller than a coercivity of the first magnet element;
    the rotor core includes a flux barrier including a void located on a radially inner side of each of the first magnet elements and that is sandwiched between a wall surface on the radially inner side and a wall surface on a radially outer side;
    a width of each of the magnets including the first magnet elements in a first direction perpendicular or substantially perpendicular to a radial direction passing through a center of the corresponding first magnet element is larger than a width in the first direction of the corresponding flux barrier within a plane perpendicular or substantially perpendicular to the center axis; and
    each of the flux barriers includes two end portions, both of the two end portions of each of the flux barriers include extension portions which respectively extend radially outward toward both an outer circumference of the rotor core and boundaries directly between the first magnet element and the two second magnet elements within the plane perpendicular or substantially perpendicular to the center axis, the first magnet element and the two second magnet elements being located radially outward from the flux barriers and entireties of the extension portions being radially inward from the first magnet element and the two second magnet elements.

2. The motor according to claim 1, wherein each of the flux barriers has a convex shape extending toward the radially inner side within the plane perpendicular or substantially perpendicular to the center axis.

3. The motor according to claim 1, wherein
    each of the flux barriers includes a center portion that extends in the first direction, the extension portions, extending toward the outer circumference of the rotor core from two ends of the center portion within the plane perpendicular or substantially perpendicular to the center axis; and
    the extension portions separate from each other with increasing distance as the two extension portions extend toward the outer circumference.

4. The motor according to claim 1, wherein directions in which both of the two end portions extend are aligned with a first direction parallel or substantially parallel to the radial direction passing through the center of the first magnet element, a second direction parallel or substantially parallel to a radial direction passing through a center point which is between the one of the plurality of magnets including the first magnet element and another one of the plurality of magnets directly adjacent to the one of the plurality of magnets, or a direction between the first direction and the second direction.

5. The motor according to claim 1, wherein each of the flux barriers has a straight shape extending in the direction perpendicular or substantially perpendicular to the radial direction passing through the center of the first magnet element within the plane perpendicular or substantially perpendicular to the center axis.

6. The motor according to claim 1, wherein each of the flux barriers includes a center portion that extends in the first direction, and a total width of the center portion of the flux barrier in the radial direction is about 1.1 times or more to about 1.5 times or less of a total width of the center portion of the flux barrier in the first direction.

7. The motor according to claim 1, wherein a distance between an outer circumferential surface of the rotor core and each of the first magnet elements in the radial direction passing through the center of the first magnet element is about 1.5 times or more to about 2.0 times or less of a width in the same direction of the first magnet element.

8. The motor according to claim 1, wherein
    an outer circumferential surface of the rotor core includes a convex portion that projects radially outward on the radially outer side of each of the first magnet elements; and
    a curvature radius of the convex portion is about 0.3 times or more to about 0.4 times or less of a diameter of the rotor core within the plane perpendicular or substantially perpendicular to the center axis.

9. The motor according to claim 1, wherein
    the rotor core includes two lateral flux barriers that include voids of the rotor core on opposite circumferential sides of each of the magnets; and
    the two lateral flux barriers are in contact with only surfaces on the opposite circumferential sides of each of the magnets.

* * * * *